May 19, 1970 J. T. CRAFT 3,512,828
PICKUP BED CAP

Filed Sept. 5, 1967 7 Sheets-Sheet 1

INVENTOR.
JOHN T. CRAFT
BY Ronald W. Mayes

May 19, 1970  J. T. CRAFT  3,512,828
PICKUP BED CAP
Filed Sept. 5, 1967  7 Sheets-Sheet 2

INVENTOR.
JOHN T. CRAFT
BY Ronald W Mayer

May 19, 1970  J. T. CRAFT  3,512,828
PICKUP BED CAP
Filed Sept. 5, 1967  7 Sheets-Sheet 3

INVENTOR.
JOHN T. CRAFT
BY Ronald W Mayer

May 19, 1970  J. T. CRAFT  3,512,828
PICKUP BED CAP

Filed Sept. 5, 1967  7 Sheets-Sheet 4

INVENTOR.
JOHN T. CRAFT
BY Ronald W Mayer

May 19, 1970 J. T. CRAFT 3,512,828
PICKUP BED CAP
Filed Sept. 5, 1967 7 Sheets-Sheet 5
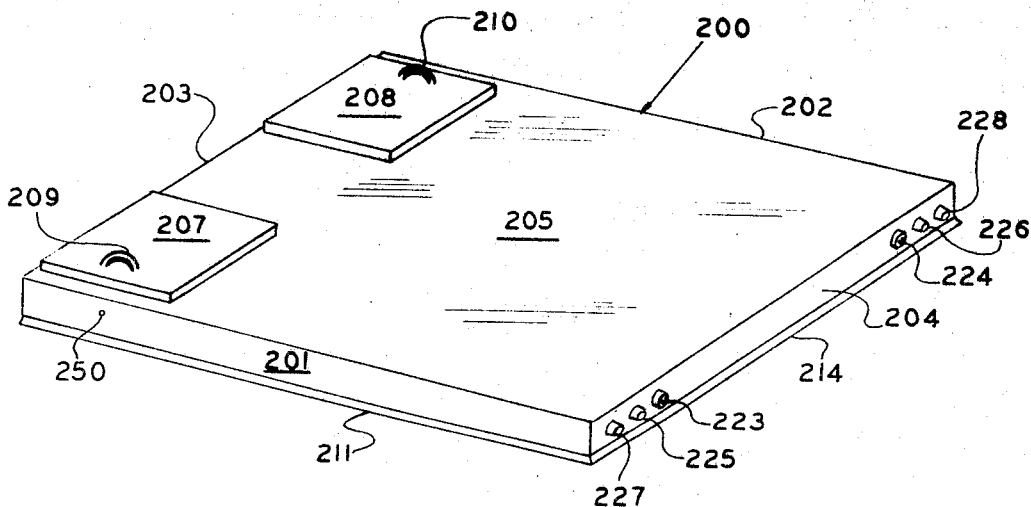
FIG. 11
FIG. 12
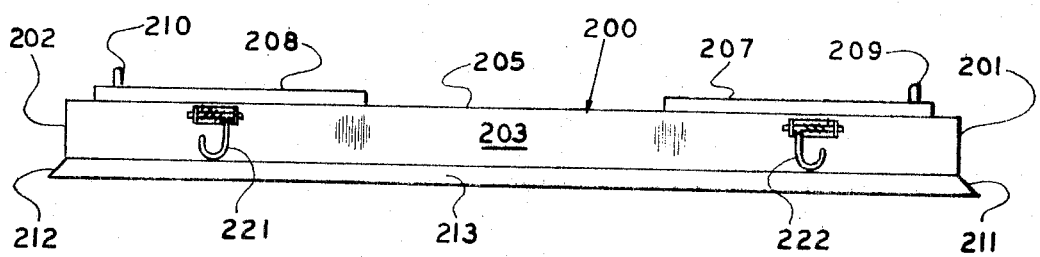
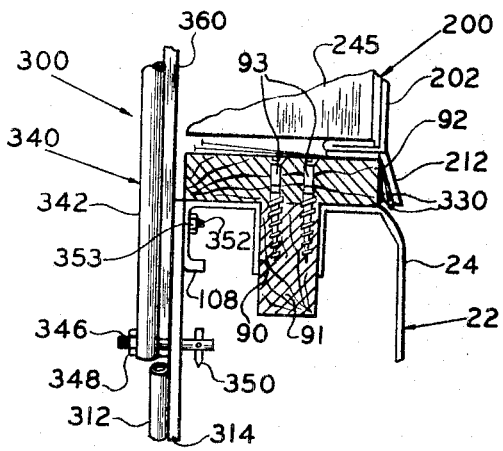
FIG. 19
INVENTOR.
JOHN T. CRAFT
BY Ronald W Mayer

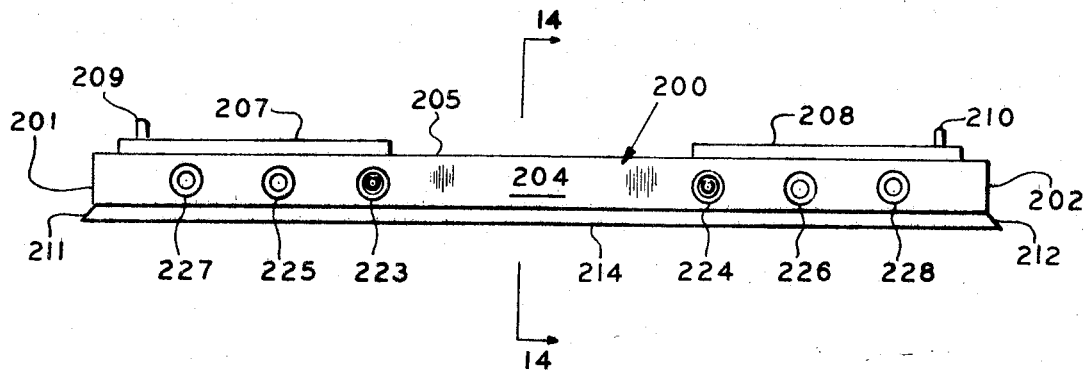
FIG. 13
FIG. 14
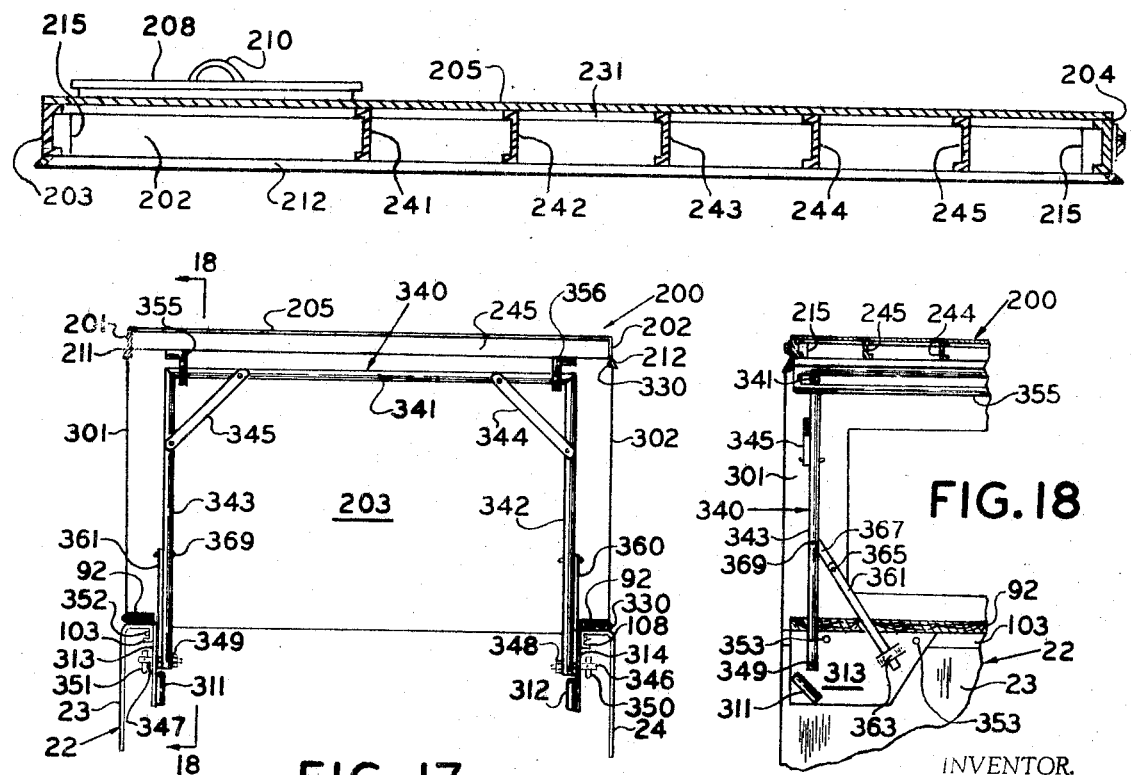
FIG. 17
FIG. 18
INVENTOR.
JOHN T. CRAFT
BY Ronald W. Mayer May 19, 1970 — J. T. CRAFT — 3,512,828
PICKUP BED CAP
Filed Sept. 5, 1967 — 7 Sheets-Sheet 7

INVENTOR.
JOHN T. CRAFT
BY Ronald W. Mayes

United States Patent Office 3,512,828
Patented May 19, 1970

3,512,828
PICKUP BED CAP
John T. Craft, Mount Hope, Kans., assignor to Jolyn Corporation, a corporation of South Dakota
Filed Sept. 5, 1967, Ser. No. 665,475
Int. Cl. B60p 7/02
U.S. Cl. 296—100
7 Claims

ABSTRACT OF THE DISCLOSURE

This invention comprises a pickup bed cap providing a liftable and removable load-carrying deck and a weather tight cover for a bed of a pickup truck. The deck has doors for providing access to the pickup bed and for providing access to special storage compartments beneath the deck. Moreover, one embodiment of the invention provides a load-carrying deck that can be erected to form a camper-like living compartment on the pickup truck.

BACKGROUND OF THE INVENTION

This invention relates to truck body enclosures. More particularly, this invention relates to a demountable closure for a bed of a pickup truck.

Pickup trucks are widely used for many different purposes for transporting items to and from a job. However, the pickup truck beds that do not have covers have the disadvantages of being open to the weather and of being susceptible to easy pilferage. Prior art pickup bed covers have the disadvantages of not having a load-carrying upper deck capable of supporting several thousand pounds of material, of not being accessible through any of a plurality of doorways in the upper deck, of not being readily accessible through the tailgate without raising the rear end of the cover, of not having one or more upper story compartments each accessible through an access doorway in the upper deck or through the tailgate, and/or not of being readily convertible into a camper-like living compartment.

It is therefore an object of this invention to provide a novel cap for a bed of a pickup truck which obviates at least one of the above disadvantages or any combination of the disadvantages as set forth hereinabove.

Another object of this invention is to provide a new and easily removable cover and deck member of simple yet light, sturdy construction, which can be lifted laterally from either side of the truck to provide full access to the entire bed of the truck.

It is a further object of this invention to provide a novel cap for a bed of a pickup truck for completely enclosing and protecting the same from the weather.

It is still another object of the invention to provide a novel pickup bed cap having a load-carrying deck capable of supporting several thousand pounds, and yet providing ready access to the pickup bed through the pickup tailgate, access doors in the deck, and/or by raising or tilting the deck from both sides or from one side thereof, respectively.

A further object of this invention is the provision of a novel pickup bed cap having a load-carrying deck suitable for supporting a load of one thousand pounds or more that can be lifted by one man, the bed cap weighing less than one hundred twenty pounds and in its preferred form weighing approximately seventy pounds.

A still further object of this invention is the provision of a novel camper that can be easily installed onto the bed of a pickup truck and erected by one man.

Yet another object of this invention is the provision of a combination pickup bed cap and camper preferably having a roof that can be collapsed for providing a load-carrying deck, the combination bed cap and camper being light enough to be handled by one man for installation and erection purposes.

This invention comprises a removable bed cap for a pickup truck that provides a load-carrying deck and a weathertight cover for the bed of the pickup. The deck is preferably reinforced to support a load of several thousand pounds. The bed cap is provided with access doors in the load-carrying deck. At least two of the doors provide access to the pickup bed at the front end thereof. Access to the pickup bed at the rear end thereof is provided by dropping the tailgate. The bed cap does not interfere with the operation of the tailgate. If access to the entire pickup bed is desired, the bed cap can be raised vertically or tilted laterally along any of the two longitudinal lateral sides thereof.

Additional access doors are preferably provided for separate storage compartments beneath the deck of the cover and above the pickup bed. Tie down rings are provided for lashing a load onto the load-carrying deck. Tail, stop, turn signal, and backup lamps are preferably provided at the aft end of the bed cap.

Moreover, a combination bed cap and camper embodiment of the invention comprises a bed cap that can be erected to form a camper-like compartment providing living space or shelter therein.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which:

FIG. 11 is an isometric view of a bed cap embodying a modification of the invention;

FIG. 12 is an elevational view of a fore end of the bed cap of FIG. 11;

FIG. 13 is an elevational view of an aft end of the bed cap of FIG. 11;

FIG. 14 is a cross-sectional view along line 14—14 of FIG. 13;

FIG. 17 is an elevational view of a vertically erectable support frame for converting the bed cap into a camper;

Figure 1:
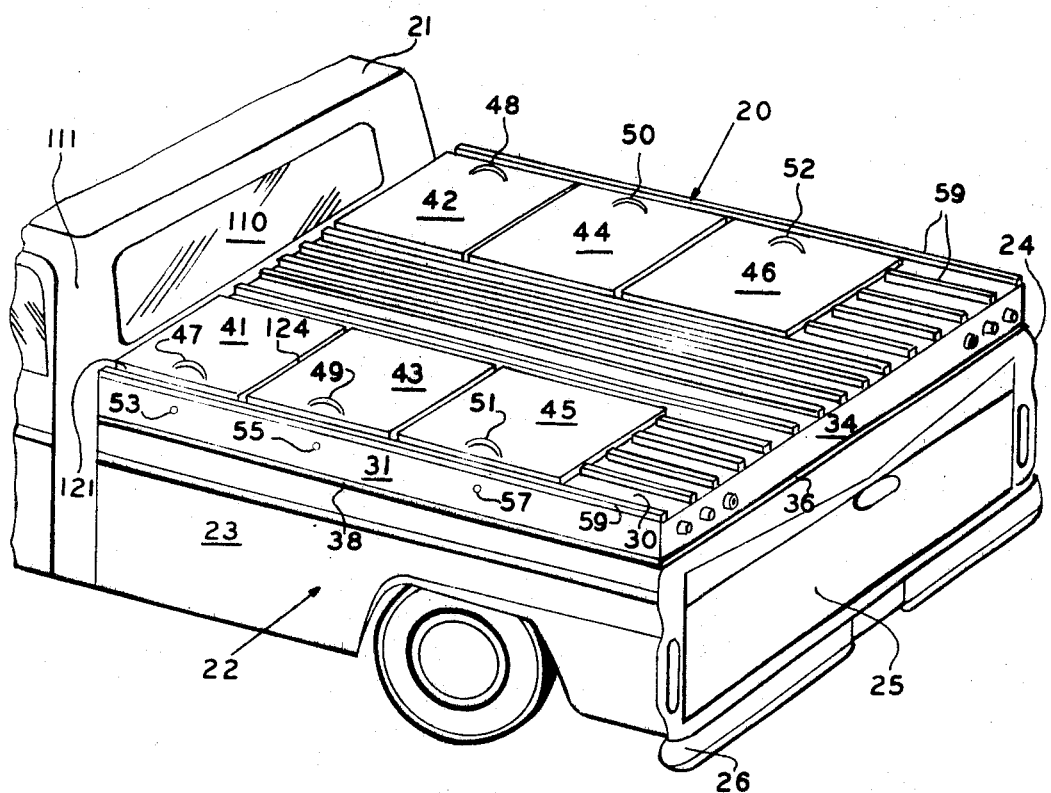
FIG. 1 is an isometric view of a pickup truck with a bed cap embodying the invention.

FIG. 18 is a cross-sectional view along line 18—18 of FIG. 17 of a base portion of the erectable support frame attached to the pickup truck for shownig the details thereof; and FIG. 19 is an enlarged view of a portion of the camper support frame attached to the pickup truck shown in FIG. 17, but with certain parts removed and in cross-section for clearly showing details of the camper support frame.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, a bed cap embodying the invention is indicated generally by the reference numeral 20. The bed cap 20 is mounted on a pickup truck 21 and forms a load-carrying cover and deck for a bed, indicated generally by the reference numeral 22, of the pickup truck 21. The bed 22 has lateral sidewalls 23 and 24, a front endwall, not shown, and a tailgate 25 adapted to swing down over a rear bumper 26.

Although the pickup truck 21 has been illustrated and described herein, it is to be understood that the bed cap 20 can be fitted to other vehicles having beds similar to the bed 22 referred to herein.

The bed cap 20 comprises a rectangular deck panel 30 substantially the same shape and size of the bed of the pickup 21. The bed cap 20 has a depending skirt or flange connected thereto substantially around the entire periphery thereof. More particularly, the skirt comprises two parallely disposed, elongated, rectangular lateral sidewalls 31 and 32 and parallely disposed, elongated, rectangular fore and aft endwalls 33 and 34, FIGS. 1 and 2. The endwalls 33 and 34 are preferably of channel-shaped or C-shaped cross-section.

The lower peripheral edge of the bed cap skirt is outwardly flared by providing parallely disposed elongated, frusto-conically shaped fore and aft flared skirt portions 35 and 36, and lateral parallely disposed elongated, frusto-conically shaped flared skirt portions 37 and 38. The deck 30 and the sidewalls 31 and 32 are preferably of one piece construction bent to the desired shape. The flared skirt portions 35, 36, 37, and 38 are riveted to the bed cap 20 and especially adapted to be disposed over the uppermost portions of the four sidewalls, including the tailgate 25 of the pickup bed 22 in a weathertight fashion in a manner to be described in more detail hereinafter in connection with FIG. 6.

The bed cap of FIG. 1 has provided in the deck six access doors 41, 42, 43, 44, 45, and 46 respectively provided with handles 47, 48, 49, 50, 51, and 52. All of the doors 41 through 46 are preferably provided with conventional key locks and latches, such as key locks 53, 54, 55, 56, 57, and 58 for the doors 41, 42, 43, 44, 45, and 46, respectively. Details of the construction of the doors 41 through 46 will be more fully described hereinafter in connection with FIGS. 9 and 10.

The topside of the bed cap 20 is reinforced with longitudinally extending channels or rails 59 of generally hat-shaped cross-sectional configuration riveted to the panel 30. The rails 59 are equally spaced apart and define a planar surface. The rails 59 also provide a skid surface for cargo being loaded onto the deck 30 of the bed cap 20. The rails 59 have an overall height substantially the same as the overall height of the access doors 41 through 46.

The corners of the bed cap skirt are preferably provided with fillets formed by sheet metal webs of the fore and aft endwalls 33 and 34 extending around the corners for the purpose of riveting the sidewalls 31 and 32 to the endwalls 33 and 34. Preferably the skirt portions 35, 36, 37, and 38 are welded together at the corners. However, metal chips can be provided if desired.

TIE DOWN HOOKS

Figure 6:
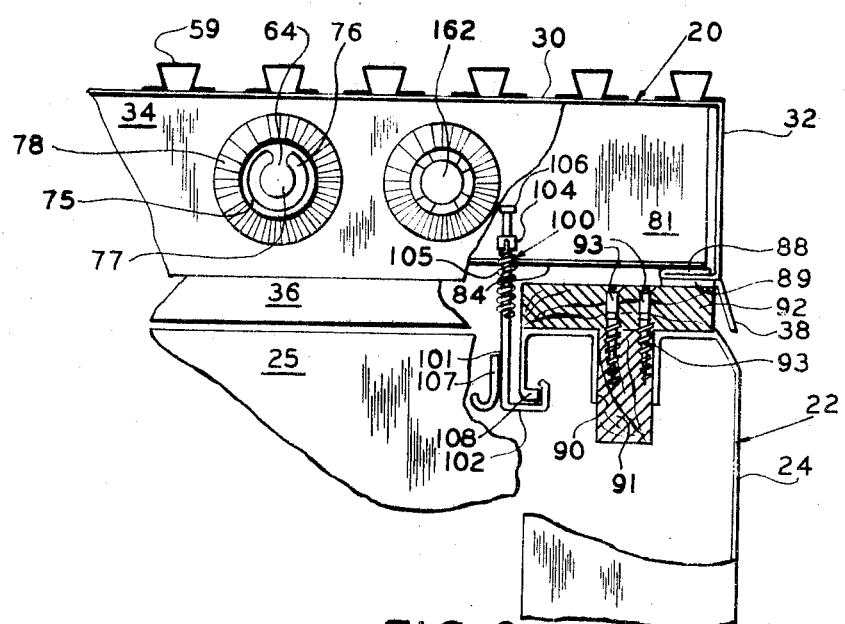
FIG. 6 is an enlarged partial elevational view of an aft end of the bed cap of FIG. 1, but with parts broken away and in section to show details of mounting and resiliently fastening the cap to the pickup truck.
Figure 7:
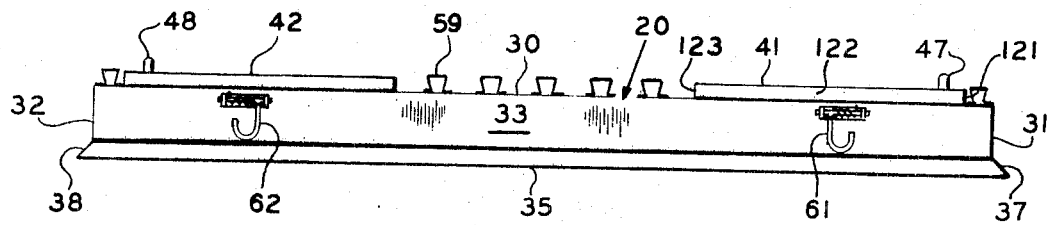
FIG. 7 is an elevational view of a fore end of the bed cap in FIG. 1 showing two tie down hooks useful in lashing a load onto a deck of the bed cap.

Cargo may be lashed to the deck 30 by ropes, anchored to tie down hooks 61 and 62, pivotally mounted on the endwall 33 at the fore end of the bed cap 20, FIG. 7, and to tie down hooks 63 and 64 fixed to the endwall 34 at the aft end of the bed cap 20, FIGS. 1, 2, 3, and 6.

Figure 8:
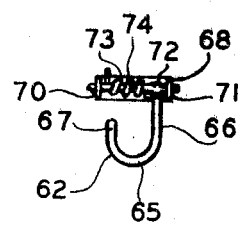
FIG. 8 is an enlarged view of one of the tie down hooks shown in FIG. 7.
Figure 15:
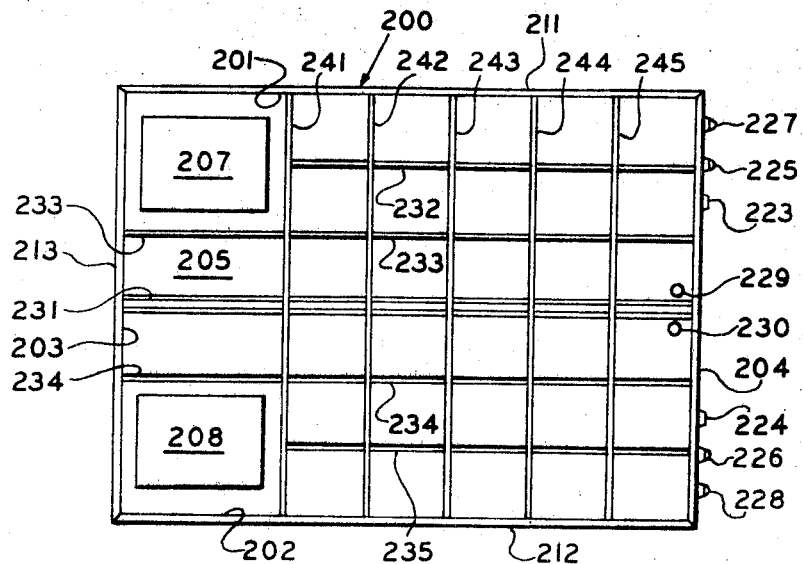
FIG. 15 is a plan view of a bottomside of the bed cap of FIG. 11.

The tie down hooks 61 and 62 are identical and are oppositely disposed to each other. Accordingly, only the hook 62 need be described. As seen in FIG. 8, the hook 62 has an arcuate bight portion 65 and a shank portion 66 parallely disposed to a terminal end portion 67. The shank portion 66 is perpendicularly disposed to and integrally connected to an horizontal pivot pin portion 68. The outer ends of the pivot pin portion 68 are journaled in corresponding openings formed in forwardly projecting parallel legs 70 and 71. The legs 70 and 71 are integrally connected to a web 72 to form a U-shaped bracket 73. In order to hold the hook 62 in a down position when not in use, a torsion spring 74 is disposed about the pivot pin portion 68 of the hook 62. A horizontal end of the torsion spring 74 is disposed over the shank portion 66 of the hook 62. An opposite end of the torsion spring 74 bears against the web 72 of the bracket 73 and extends upwardly. The bracket 73 is connected to the front endwall 33, preferably by the use of rivets, not shown.

The tie down hooks 63 and 64, symmetrically arranged at the aft end of the bed cap 20, are preferably of similar construction and are laterally spaced apart from each other approximately the same distance as the tie down hooks 61 and 62 are laterally spaced from each other at the forward end of the bed cap 20.

The details of the tie down hook 64 are shown in FIG. 6. The hook 64 comprises a metal disk 75 having an arcuate cutout 76 formed therein to define a central depending tang 77 having an arcuate peripheral portion. The disk 75 is connected to and enclosed by an outer end of a frusto-conically shaped housing 78. The housing 78 has a circular base plate secured to the aft endwall 34 in a conventional manner.

BED CAP CONSTRUCTION

Preferably, the bed cap is of an all metal construction except for certain obviously nonmetallic parts to be described. The preferred metal is aluminum in order to hold the weight of the bed cap 20 to a minimum for easy portability. Preferably, the bed cap 20 of this embodiment weighs approximately one hundred twenty pounds. Moreover, although fusion means or other conventional fasteners may be used, it is preferred that the aluminum parts be connected together by rivets unless otherwise described herein.

Figure 2:
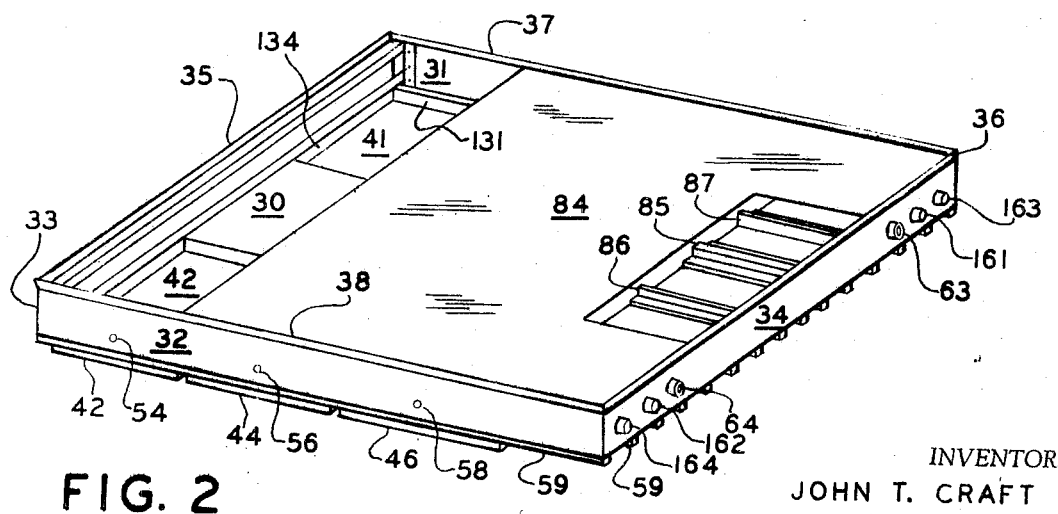
FIG. 2 is an isometric view of a bottomside of the bed cap shown in FIG. 1.
Figure 4:
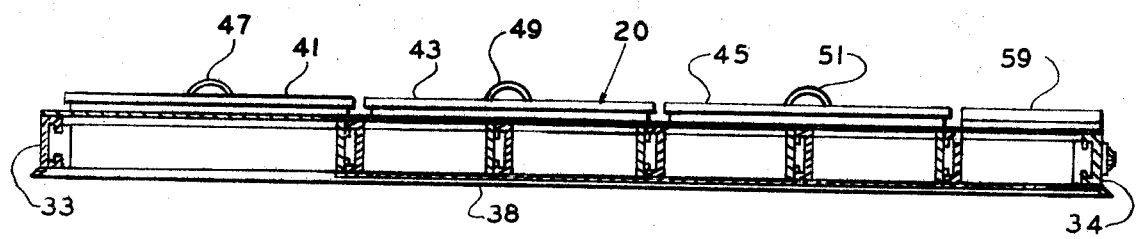
FIG. 4 is a cross-sectional view taken along line 4—4 of FIG. 3.
Figure 5:
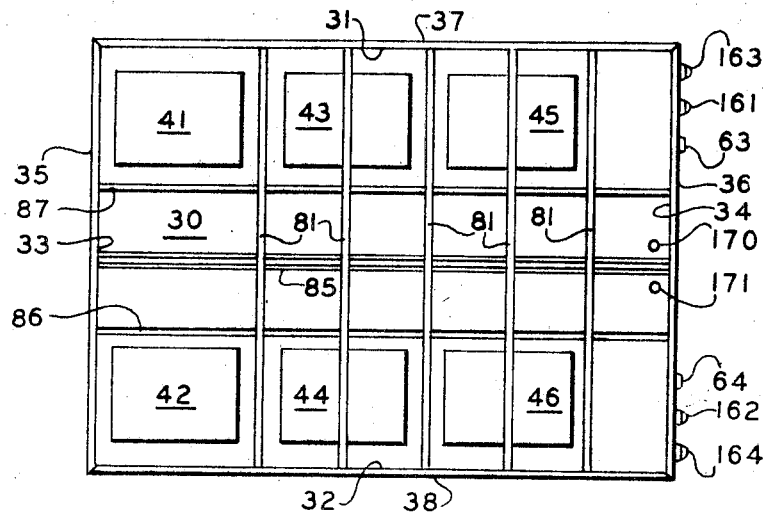
FIG. 5 is a plan view of the bottomside of the bed cap of FIG. 1, but with a bottom panel removed.

Referring to FIGS. 2 and 5, the bed cap 20 has five equally spaced, parallel, and transversely extending box-like cross beams 81 of channel-shaped or C-shaped cross-section the same as the endwalls 33 and 34. The cross beams form ribs for the bed cap 20. The box-like configuration of each beam 81 is obtained by riveting or otherwise securing a rectangular metal panel to coplanar feet or flanges at the ends of the legs of each cross channel. The upper legs of each of the beams 81 are riveted to the underside of the deck panel 30. The five beams 81 have the same web width and are as wide as the endwalls 33 and 34. The lower legs of each of the beams 81 are connected to a lower panel 84. The panel 84 forms a floor or bottom for two rectangular storage compartments accessible by the two doors 43 and 44, and the two doors 45 and 46, respectively. Each of the storage compartments extends the width of the bed cap 20. The storage compartments, accessible through the doors 43, 44, 45, and 46, are each divided or partitioned by a beam 81.

A longitudinally extending central channel member 85 has a hat-shaped cross-sectional configuration. The channel 85 forms a spine or backbone for the bed cap 20. The channel 85 has a web of substantially the same width of each of the legs thereof and is riveted to the underside of the deck panel 30. The member 85 preferably extends through cutout portions of each of the beams 81. The member 85 is substantially the same length as the deck panel 30. Preferably additional reinforcement of the deck 30 is provided by two angle runners 86 and 87 of right angle cross-section riveted to the underside of the deck panel 30. The runners 86 and 87 are oppositely disposed and equally spaced on either side of the channel 85.

The box-like construction of the bed cap 20 is capable of supporting several thousand pounds of payload on the deck 30 thereof.

Referring to FIG. 6, the bottom panel 84 around the entire periphery thereof is fastened preferably by riveting to horizontal flanges of the beams 81 and of the sidewalls 31, 32, 33, and 34 of the bedcap 20. Since the construction of the sidewalls 31 and 32 is similar, only the construction of the sidewall 32 will be described. The sidewall 32 has a lower longitudinal edge portion 88 folded inwardly at right angles thereto and then folded back upon itself 180 degrees in a reverse direction. The portion 88 is connected to the bottom panel 84. A horizontal flange portion 89 of the flared skirt 38 and the horizontal flange portion 88 of the sidewall 32 are riveted to the bottom panel 84. The flared skirt portion 38 is formed with a V-shaped cross-section having an obtuse included angle, FIG. 6. The skirts 35, 36, and 37 are constructed the same as the skirt 38. The angle of flare as well as the length of the skirts may be varied according to needs. The flare of the skirts 35, 36, 37, and 38 of the bedcap 20 is approximately eighteen degrees from the vertical.

The lateral sidewalls of most piccekup truck beds have stake holes comprising upwardly facing rectangular openings, such as an opening 90 formed therein for accommodating the insertion of substantially vertical stakes, such as the stake 91 in FIG. 6. The vertical stake 91 has an elongated horizontal pad 92 connected thereto preferably by two wood screws 93. The pad 92 and the stake 93 form a T-stake and are preferably made of wood to prevent unnecessary wear and tear on the bed cap 20 and the sidewall 24 of the pickup bed 22. The horizontal flange portion 89 of the skirt 38 bears directly against the pad 92 of the T-stake.

As many T-stakes are provided as there are stake holes 90 in the bed 22 of the pickup truck 21. Preferably there is a pad 92 running the length of each of the bed sidewalls 23 and 24. The skirt portion 38 extends downwardly far enough over the sidewall 24 of the bed 22 to provide a weathertight compartment.

BEDCAP FASTENERS

There may be as many fasteners for connecting the bedcap in place as there are cross beams and endwalls.

A fastener, indicated generally by the reference numeral 100, is shown in FIG. 6. There are preferably four fasteners 100 holding down the bedcap 20, one on each end of each of two of the beams 81 that are spaced farthest from each other. The entire bedcap 20 is resiliently fastened to the sidewalls 23 and 24 of the bed 22 by the four fasteners 100.

Each fastener 100 comprises a vertically extending rod 101 having a hook 102 at the lower end thereof adapted to engage a downwardly depending flange 108 of the bed sidewall 24 in FIG. 6. Two longitudinally spaced fasteners 100 on each side of the bedcap engage a similarly downwardly depending flange 103, FIG. 17, of the bed sidewall 23. A rod guide block 104 is fixed to a web of each of the beams 81 at each end thereof. The rod 101 is slidingly guided in a vertical drill hole in the guide block 104. A helical tension spring 105 is disposed about the rod 101 and has an upper end fastened to the guide block 104 and has a lower and opposite end fastened to the rod 101 in a conventional manner. Preferably each rod 101 has a nut 106 threaded on the upper end thereof as a guide stop. Additionally, a finger pull down hook 107 is fixed, as by welding, to a lower end of the rod 101 for assisting in the easy installation and removal of the bed cap 20 and the fasteners 100.

Accordingly, it is apparent that the fasteners 100 on the left hand side of the bed cap 20 can be released and the bed cap tilted in a clockwise direction about the skirt 38 on the T-block pad 92 for providing access to the entire bed 22 on the left hand side of the pickup truck 21. Conversely, the right hand side of the bed cap 20 can be raised by releasing the fasteners 100 on the right hand side of the bed cap off of the pad 92, FIG. 6.

As seen in FIG. 1, the deck 30 of the bed cap 20 can be observed from a rear view window 110 of a cab 111 of the pickup truck 21. The bed cap 20 in FIG. 1 does not obstruct the rear vision of the driver of the truck 21.

DOOR CONSTRUCTION

Figure 9:
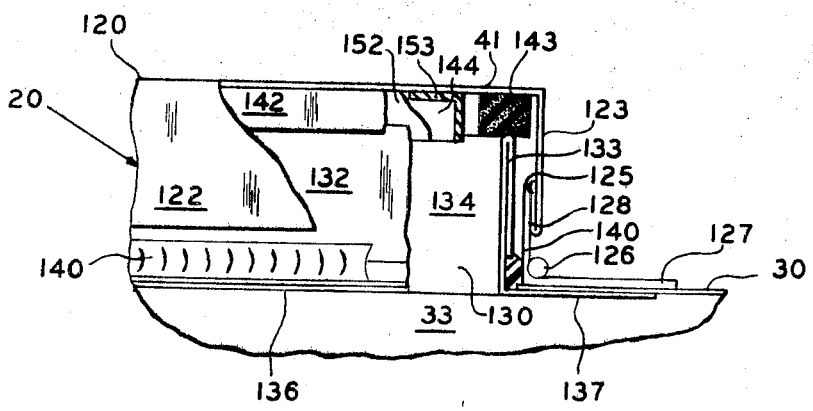
FIG. 9 is an enlarged fragmentary elevational view of a door frame with an access door in closed position thereon and with various parts broken away and in section to show details of the construction thereof.

The construction of the access doors 41 through 46 are preferably identical. Accordingly, only the construction of the access door 41 will be described herein. As seen in FIGS. 1, 7, and 9, the door 41 has a planar upper panel 120 and four integrally connected sheet metal sides 121, 122, 123, and 124 disposed at right angles thereto. The sides 121, 122, 123, and 124 each have a flange portion bent 180 degrees inwardly and back upon itself, such as a flange portion 125 of the sidewall 123 in FIG. 9. This construction reinforces the sidewalls 121, 122, 123, and 124 and provides the lower edge of the sidewalls with a smooth lip when the door 41 is open.

A piano hinge 126 has two rectangular flanges 127 and 128 respectively riveted or otherwise suitably fastened to the deck panel 30 and the flange portion 125 of the door sidewall 123.

A rectangular doorway 130 is provided in a rectangular opening formed in the deck panel 30. The doorway 130 has four upwardly extending rectangular panels 131, 132, 133, and 134, FIGS. 2 and 9. Each of the panels 131, 132, 133, and 134 has an angular cross-section with an horizontal leg, such as a leg 136 of the panel 132 and a leg 137 of the panel 133, riveted to the underside of the deck panel 30. Each of the panels 131, 132, 133, and 134 at the erect upper ends thereof is reinforced by bending the upper portions thereof outwardly and back upon themselves. In this manner the upper edges of the doorway 130 are smoothly rounded and free of sharp edges for sealingly engaging four weatherproofing strips 141, 142, 143, and 144, respectively.

Figure 10:
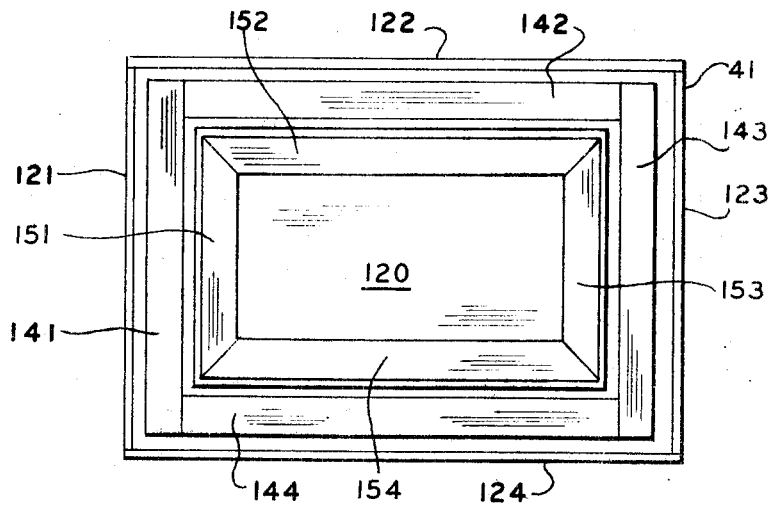
FIG. 10 is an enlarged plan view of a bottomside of an access door shown in FIG. 1.

As seen in FIGS. 9 and 10, the door 41 is provided with rectangular weatherproofing formed from the four strips 141, 142, 143, and 144 of resilient foam rubber of rectangular cross-section, that respectively engages corresponding upper edges of the doorway panels 131, 132, 133, and 134.

The four corners formed by the adjoining panels 131, 132, 133, and 134 are preferably joined together by welding. However, the same purpose can be accomplished with angle members, or in some other suitable manner such as by forming the panels 131, 132, 133, and 134 all from the same strip of sheet metal and then welding the remaining corner.

The connection of the panels 131, 132, 133, and 134 to the deck panel 30 is made watertight by the provision of a suitable fillet of a polymeric adhesive and sealant 140 around the external periphery of the doorway.

Rigidity is added to the door panel 120 by a rectangular box-frame made of angles 151, 152, 153, and 154 riveted to the underside of the door panel 120. The construction of the door 41 is symmetrical, with all corners defining angles of 90 degrees, and with opposite sides being parallel to each other.

Actual construction of hardware such as the door handles 47 through 52 and individual latches and locks therefor, such as the locks 53, 54, 55, 56, 57, and 58, are conventional and are therefore not shown in greater detail.

Figure 3:
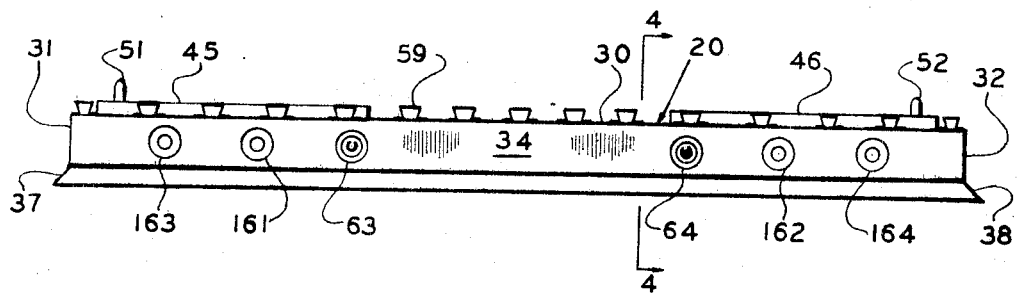
FIG. 3 is an elevational view of an aft end of the bed cap of FIGS. 1 and 2.

For road safety, backup lights 161 and 162 are provided on each side of the aft end panel 34 respectively adjacent the tie down hooks 63 and 64, FIGS. 1, 3, and 6. Also combination tail lights, stop or brake lights, and turn signals 163 and 164 are provided respectively adjacent the backup lights 161 and 162. Additionally a dome light 170 and a switch 171 therefor, are provided interiorly of the bed cap 20 attached to the underside of the deck panel 30 adjacent the tailgate 25 for convenience of the user. The electrical wiring and connections, not shown, for these lamps are conventional and are preferably connectible into the electrical system of the pickup truck 21.

LIGHTWEIGHT BED CAP

A modification of the present invention is shown in FIGS. 11, 12, 13, 14, and 15, which is lighter and easier to handle. A modified bed cap is indicated generally by the reference numeral 200. If made of aluminum throughout, the bed cap 200 preferably weighs less than seventy pounds. A box-like rectangular construction is provided by parallel sidewalls 201 and 202 and parallel fore and aft endwalls 203 and 204 surrounding a flat rectangular deck panel 205. The deck panel 205 is free of any reinforcement rails on the upper surface thereof. Preferably the deck panel 205 is integrally connected to the sidewalls 201 and 202. The fore and aft endwalls 203 and 204 are comprised of channel-shaped cross beams.

Access doors 207 and 208 with door handles 209 and 210 are provided in the upper deck of the bed cap 200. The doors 207 and 208 are preferably similar in construction to the doors 41 and 42, respectively. A depending outwardly flared skirt of frusto-conically shaped panels 211, 212, 213, and 214 are respectively depending from the sidewalls 201 and 202 and the endwalls 203 and 204. Preferably the walls of the skirt are welded together at the four corners thereof. Corner clips, not shown, may be provided if desired.

Tie down hooks 221 and 222, FIG. 12, are provided in the front endwall 203 similar in construction to the tie down hooks 61 and 62 described hereinabove. As seen in FIGS. 11, 13, 14, and 15, tie down hooks 223 and 224 are provided at the rear endwall 204 similar in construction to the tie down hooks of FIGS. 1 through 10.

The aft endwall 204 is also provided with lamps 225 and 226 that function as backup lights. Lamps 227 and 228 are positioned on the aft endwall 204 laterally of and adjacent the lamps 225 and 226. The lamps 227 and 228 function as running lights, brake and stop lights, and as turn signals. A dome lamp 229 and a switch 230 are provided on the aft underside of the deck panel 205, FIG. 15. The lamps 225, 226, 227, 228, and 229 and the switch 230 are connected into the electrical system of the pickup truck 21 in a conventional manner.

The underside of the deck panel 205 has a longitudinally extending centrally located beam 231 of hat-shaped cross-section riveted to the underside thereof. Four panel stiffeners or runners 232, 233, 234, and 235 of angular cross-section are positioned parallel to the center beam 231 on the underside of the deck panel 205 and riveted in place. The runners 232 through 235 comprise two integrally connected planar flanges disposed at right angles to each other.

Five cross beams 241, 242, 243, 244, and 245 of U-shaped or channel-shaped cross-section are equally spaced from each other and from the cross beam forming the aft endwall 204, FIG. 14. The cross beams 241 through 245 are preferably riveted to the underside of the deck panel 205.

The box-like construction of the bed cap 200 provides a strong yet light and portable article of manufacture.

The deck panel 205 preferably supports a load of several thousand pounds.

The bed cap 200 is fastened to the bed 22 of the pickup truck 21 with four fasteners 100 described hereinabove in connection with FIG. 6. Accordingly, the bed cap 200 can be tilted or raised to provide access to the entire bed 22 of the pickup truck 21. Alternatively access can be obtained through the doors 207 and 208 and the tailgate 25. Conventional door locks, such as the door lock 250, are provided for the access doors 207 and 208, FIG. 11.

CAMPER BED CAP MODIFICATION

Another modification of this invention is shown in FIGS. 16, 17, 18, and 19. A camper bed cap is indicated generally by the reference numeral 300. The bed cap portion of the camper bed cap 300 is of the same construction as the lightweight bed cap 200. Accordingly, corresponding parts bear the same reference numerals in FIGS. 16, 17, 18, and 19.

Figure 16:
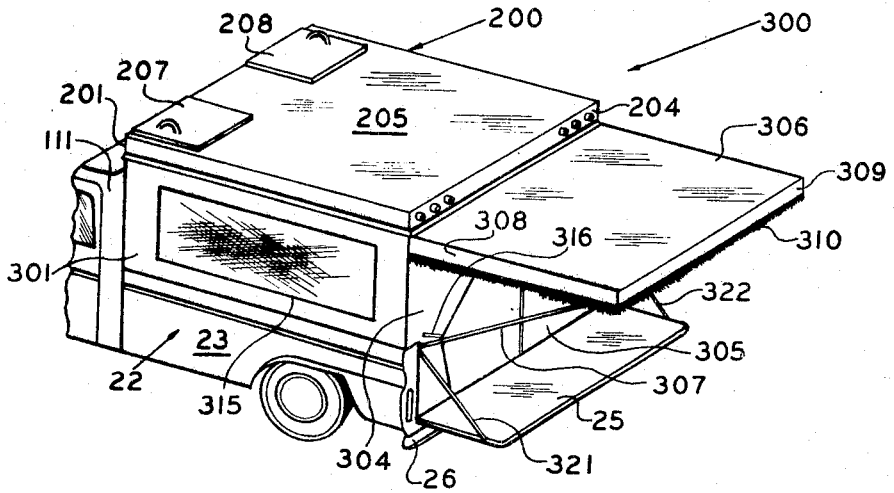
FIG. 16 is an isometric view of a pickup truck, similar to FIG. 1, having a bed cap mounted thereon embodying a further modification of the invention.

Referring to FIG. 16, the camper bed cap 300 comprises a bed cap indicated generally by the reference numeral 200, two similar but oppositely disposed flexible panels or sidewalls 301 and 302, a flexible front panel or endwall 303 and a rear panel or endwall comprising two flexible curtains 304 and 305. An awning 306 is also provided at the aft end of the bed cap 200.

The awning 306 is supported by a U-shaped support frame comprising a pair of support poles 307 connected together by an horizontal pole, not shown, secured beneath an aft end of the awning 306 in a conventional manner. The awning 306 has flexible sidewalls 308 and a flexible rear endwall 309 having a decorative fringe 310 at the lower hems thereof. The awning support poles 307 are supported at the lower ends thereof in support cups 311 and 312 respectively fixed to camper support plates 313 and 314, FIGS. 17 and 18.

The sidewalls 301 and 302 each preferably have a large rectangular window of mosquito netting symmetrically and centrally located therein, such as the window 315 in the sidewall 301. A tie back 316 is provided for the curtain 304, FIG. 16.

As seen in FIG. 16, the camper bed cap 300 is erected from a position similar to that shown in FIG. 1 by one man. This is accomplished by dropping the tailgate 25 and the man crawling in under the bed cap 200 and raising the same. Two flexible tailgate support cables 321 and 322 hold the tailgate 25 in an horizontal attitude for providing a porch and step combination.

The sidewalls 301 and 302, the front endwall 303, the curtains 304 and 305 and the awning 306 are preferably made of a heavyweight water repellant material, such as canvas, that can be folded inwardly and downwardly when the bed cap 200 is lowered to its travel posture shown in FIG. 1. The canvas is preferably of one piece or sewed together construction insofar as the sidewalls 301 and 302 the front endwall 303 and the curtains 304 and 305 are concerned The awning 306 preferably has its walls 308 and 309 sewed thereto in a conventional manner It is preferred that the canvas be secured to the bed cap 200 inside the flanges 211, 212, 213, and 214 and the lateral sides of the T-stake pads 92 by means of conventional metal snaps 330, FIG. 19. The snaps 330 are horizontally aligned and spaced apart a desired distance, depending upon the size of the pickup bed cap 200 and the number of snaps desired to be used. The snaps 330 are preferably riveted to the flanges 211, 212, 213, and 214, sewed to the canvas, and fastened to the wood pads 92 by screws or nails, not shown. Since the snaps 330 are conventional, the details thereof are not shown.

The bed cap 200 is supported by a pair of U-shaped support assemblies at a point preferably located aft of the access doors 207 and 208 and at the aft end of the bed cap 200 as shown in FIGS. 17, 18, and 19. Only one of the two assemblies is shown since they are substantially alike. The aft end support assembly is indicated generally by the reference numeral 340.

The support assembly 340 comprises a horizontal cross member 341 and two parallel support legs 342 and 343 integrally connected to the ends of the member 341 at the upper ends of the legs 342 and 343. Rigidity is added to the support assembly 340 by the provision of corner braces 344 and 345 pivotally connected to the cross member 341 and to the legs 342 and 343, respectively, by suitable means such as rivets.

The lower end of the leg 343 is pivotally connected to the camper support plate 313 by means of a horizontal pivot pin 347 having a nut 349 threaded on one end thereof. The pin 347 at a bifurcated opposite end thereof, has a key member 351 pivotally connected thereto by suitable means. The key member 351 is disposed horizontally for inserting the pivot pin 347 through a circular hole in the support plate 313, FIGS. 17 and 18.

The other leg 342 is similarly supported at a lower end thereof by a pivot pin 346 disposed in a circular opening in the support plate 314. A nut 348 is threaded onto one end of the pin 346. A key member 350 is pivotally supported by suitable means in a bifurcated opposite end of the pin 346. The key members 350 and 351 are each conically-shaped and tapered to a point at one end thereof for aiding in installing the support assembly 340 onto the bed 22 of the pickup truck 21.

The support plates 313 and 314 are secured to the flanges 103 and 108 of the pickup bed sidewalls 23 and 24, respectively, by suitable fasteners such as bolts 352 and nuts 353. The plates 313 and 314 are similarly shaped in the form of a trapezoid, but are oppositely disposed.

The cross member 341 is slideably disposed for fore and aft movement in an elongated, horizontal guide track or slot formed in each of two coplanar, horizontal and parallel members 355 and 356 of right angle cross-section. The members 355 and 356 are angle members, each having an upper horizontal flange fixed to the underside of the bed cap 200. More particularly, the upper horizontal flanges are riveted to the lower flanges or legs of the channel-shaped cross beams 215, 245, 244, 243, and 242, FIG. 18.

The legs 342 and 343 are braced, when erected, by foldable braces 360 and 361. The brace 361 is shown in FIG. 18 having a lower end portion extending through a loop 363 formed in the support plate 313. The brace 361 is pivotal at a pivot pin 365 for withdrawing or retracting the brace 361 from the confines of the loop 363 when lowering the bed cap 200. An upper portion of the brace 361 comprises a segment 367 pivotally connected to the leg 343 by a rivet 369. The foldable brace 360 is similarly constructed.

The bed cap support assembly 340 holds only a part of the weight of the bed cap 200, the duplicate or other assembly is not shown but is preferably located aft of the doors 207 and 208 as pointed out hereinabove. The guide tracks of the duplicate assembly are positioned parallel to and between the track members 355 and 356. However, it is to be understood that the other support assembly may be located at the extreme fore end of the bed cap 200 and the track members 355 and 356 could be extended and shared by both support assemblies, if desired, where the length of the support legs 343 and 342 are less than half the length of the bed cap 200 and the track members 355 and 356.

It will be understood that this invention can be modified to adapt it to various circumstances and conditions, and it is accordingly desired to comprehend within the purview of this invention such modifications as may be considered to fall within the scope of the appended claims.

What is claimed is:

1. A load-carrying cover and deck for a load-carrying bed of a pickup truck provided with sides having upwardly opening sockets formed therein comprising, a rectangular sheet metal deck member substantially the same size and shape as the pickup truck load-carrying bed, elongated rectangular sheet metal side wall means depending from said rectangular sheet metal deck member around the entire periphery thereof, outwardly flared elongated sheet metal skirt means depending from said side wall means around the entire periphery thereof and adapted to rest on and to be supported by the upper peripheral portions of the pickup truck load-carrying bed sides, a plurality of transversely extending channel-shaped support members connected to the underside of said deck member and spaced longitudinally of each other, a plurality of longitudinally extending support members of hat-shaped cross-section connected to the topside of said deck member and spaced laterally of each other, T-shaped wooden deck member pad means having downwardly depending legs adapted to be disposed in the upwardly opening sockets, means for resiliently biasing said deck member at said side wall means thereof to the pickup truck load-carrying bed sides, a plurality of tie down ring means connected to said deck member on the fore and aft ends of said sidewall means, electrical signal lamp means connected to said deck member on the aft end portion of said sidewall means, and a plurality of deck access door means connected to said deck member by longitudinally extending piano hinge means for permitting access to the underside of said deck member.

2. A load-carrying cover and deck for a load-carrying bed of a pickup truck provided with sides having upwardly opening sockets formed therein comprising, deck means substantially the same size and shape as the pickup truck load-carrying bed, side wall means depending from said deck means around the entire periphery thereof, skirt means depending from said side wall means around the entire periphery thereof and adapted to rest on and to be supported by the upper peripheral portions of the pickup truck load-carrying bed sides, a plurality of first support members connected to the underside of said deck means, a plurality of second support members connected to the topside of said deck means, deck pad means having downwardly depending legs adapted to be disposed in the upwardly opening sockets, means resiliently biasing said deck means at the lateral sides thereof to the pickup truck load-carrying bed sides, and a plurality of deck access door means pivotally connected to said deck means for permitting access to interior of the pickup load-carrying bed from the sides thereof.

3. A load-carrying cover and deck as set forth in claim 2, further comprising second deck means connected to the underside of said first support members for providing upper floor storage compartment means accessible through at least one of said deck access door means.

4. A load-carrying cover and deck as set forth in claim 2, further comprising a plurality of tie-down ring means connected to said deck means on the fore and aft ends of said sidewall means.

5. A load-carrying cover and deck for a load-carrying compartment of a pickup truck, the compartment comprising a bed and peripheral wall, the cover and deck being adapted to permit access to the bed and to enclose the top of the compartment, the improvement comprising: first panel means having a load-carrying surface, outer flange means having the top portion thereof connected to the peripheral portions of said panel means and extending downwardly therefrom so as to encompass the top outer wall portion of the pickup bed, fastening means connecting said outer flange means to said pickup bed, said outer flange means being so shaped that said panel means may be tilted and raised away from the pickup truck bed on one of the sides thereof by releasing said fastening means on the side to be raised; door frame means formed in said first panel means; access door means connected to said panel means for enclosing said door frame means and for providing access therethrough when in open position to the underside of the load-carrying cover and deck; a plurality of longitudinally extending support members of hat-shaped cross section connected to the topside of said first panel means; and second panel means spaced below said first panel means and above the floor of the pickup bed truck for providing upper floor storage compartment means accessible through at least one of said door frame means.

6. An article of the character described comprising: means forming a load-carrying cover and deck for a load-carrying compartment of a pickup truck, fastening means for connecting said load-carrying cover and deck means to said pickup bed, said load-carrying cover and deck means being tiltable about a longitudinal axis thereof away from the load carrying compartment by releasing said fastening means at the side of said load-carrying cover and deck means on the side to be raised, door frame means formed in said load-carrying cover and deck means; access door means enclosing said door frame means and for providing access through said door frame means to the underside of said load-carrying cover and deck means; means for latching and locking said access door means, and tie down means connected to said load-carrying cover and deck means.

7. The article according to claim 6, further including lamp means providing backup, turn signal and stop signals at the aft end of said load-carrying cover and deck means.

References Cited

UNITED STATES PATENTS

| | | | |
|---|---|---|---|
| 3,246,313 | 4/1966 | Weaklend | 296—100 X |
| 2,886,375 | 5/1959 | Crawford | 296—100 |
| 935,754 | 10/1909 | Gorby | 296—100 X |
| 3,180,674 | 4/1965 | Pounds | 296—100 |
| 633,999 | 10/1899 | Hill | 296—101 |
| 2,382,376 | 8/1945 | Black | 296—27 |

PHILIP GOODMAN, Primary Examiner

U.S. Cl. X.R.

296—27